(12) United States Patent
Dougherty et al.

(10) Patent No.: US 9,460,530 B2
(45) Date of Patent: Oct. 4, 2016

(54) FIXED LAYOUT ELECTRONIC PUBLICATIONS

(75) Inventors: Casey M. Dougherty, San Francisco, CA (US); David Makower, Milpitas, CA (US); Craig Milito, Sunnyvale, CA (US); Alan C. Cannistraro, San Francisco, CA (US)

(73) Assignee: APLLE INC., Cupertino, CA (US)

( * ) Notice: Subject to any disclaimer, the term of this patent is extended or adjusted under 35 U.S.C. 154(b) by 0 days.

(21) Appl. No.: 13/466,959

(22) Filed: May 8, 2012

(65) Prior Publication Data

US 2013/0007592 A1    Jan. 3, 2013

Related U.S. Application Data

(63) Continuation of application No. 13/172,479, filed on Jun. 29, 2011.

(51) Int. Cl.
| | | |
|---|---|---|
| G06F 17/00 | (2006.01) | |
| G06T 11/60 | (2006.01) | |
| G06F 17/21 | (2006.01) | |
| G06F 17/24 | (2006.01) | |

(52) U.S. Cl.
CPC ............ *G06T 11/60* (2013.01); *G06F 17/217* (2013.01); *G06F 17/248* (2013.01)

(58) Field of Classification Search
CPC .... G06F 17/211; G06F 17/25; G06F 17/217; G06F 17/248; G06T 11/60
USPC ........................ 715/243, 252, 253
See application file for complete search history.

(56) References Cited

U.S. PATENT DOCUMENTS

| | | |
|---|---|---|
| 5,634,064 A | 5/1997 | Warnock et al. |
| 5,737,599 A | 4/1998 | Rowe et al. |
| 5,781,785 A | 7/1998 | Rowe et al. |
| 5,819,301 A | 10/1998 | Rowe et al. |

(Continued)

FOREIGN PATENT DOCUMENTS

| | | |
|---|---|---|
| CN | 1669026 A | 9/2005 |
| CN | 101443790 A | 5/2009 |

(Continued)

OTHER PUBLICATIONS

David Calhoun, The viewport metatag, May 2010.*

(Continued)

*Primary Examiner* — Scott Baderman
*Assistant Examiner* — Howard Cortes
(74) *Attorney, Agent, or Firm* — Fenwick & West LLP

(57) ABSTRACT

According to some embodiments, techniques are described herein to assist a publisher to create fixed layout pages of an electronic publication. The techniques are useful for creating cookbooks, travel books, photography books, children's books, other "illustrated books", or any other electronic publication where a fixed layout for at least some of the pages of the electronic publication is desirable. With the techniques, the publisher may embed fonts, select particular fonts and font sizes, assign visual content to fixed layout pages, and precisely position visual content at fixed positions on fixed layout pages. A scaling mechanism for an electronic reader device is also disclosed for scaling fixed layout pages to fit the size of a display screen of the reader device while maintaining the aspect ratio and assignment of visual content to fixed layout pages specified by the publisher.

36 Claims, 4 Drawing Sheets

(56) References Cited

U.S. PATENT DOCUMENTS

| | | | |
|---|---|---|---|
| 5,860,074 | A | 1/1999 | Rowe et al. |
| 6,028,583 | A | 2/2000 | Hamburg |
| 6,289,364 | B1 | 9/2001 | Borg et al. |
| 6,421,460 | B1 | 7/2002 | Hamburg |
| 6,992,687 | B1 | 1/2006 | Baird et al. |
| 7,185,274 | B1 | 2/2007 | Rubin et al. |
| 7,234,108 | B1 | 6/2007 | Madan |
| 7,243,299 | B1 | 7/2007 | Rubin et al. |
| 7,458,014 | B1 | 11/2008 | Rubin et al. |
| 7,487,447 | B1 | 2/2009 | Jerger |
| 7,496,830 | B2 | 2/2009 | Rubin et al. |
| 7,730,391 | B2 | 6/2010 | Madam |
| 7,848,951 | B2 | 12/2010 | Lidwell et al. |
| 7,886,226 | B1 | 2/2011 | McCoy et al. |
| 8,185,820 | B1 | 5/2012 | Good |
| 8,539,342 | B1 | 9/2013 | Lewis |
| 8,847,991 | B1* | 9/2014 | Upson ............... G09G 5/00 345/649 |
| 2002/0035697 | A1 | 3/2002 | McCurdy et al. |
| 2004/0123244 | A1 | 6/2004 | Campbell et al. |
| 2005/0091672 | A1 | 4/2005 | Debique et al. |
| 2006/0031760 | A1* | 2/2006 | Jacobs .................. 715/517 |
| 2006/0200752 | A1 | 9/2006 | Sellers et al. |
| 2006/0227153 | A1 | 10/2006 | Anwar et al. |
| 2007/0136685 | A1* | 6/2007 | Bhatla et al. .......... 715/800 |
| 2007/0298773 | A1* | 12/2007 | Uematsu et al. ........ 455/414.2 |
| 2008/0082807 | A1 | 4/2008 | Stempel et al. |
| 2008/0082911 | A1 | 4/2008 | Sorotokin et al. |
| 2008/0229212 | A1 | 9/2008 | Miyazaki |
| 2008/0301548 | A1 | 12/2008 | Sellers et al. |
| 2009/0094537 | A1 | 4/2009 | Alber |
| 2010/0042915 | A1 | 2/2010 | Ohara et al. |
| 2010/0080493 | A1 | 4/2010 | McGatha et al. |
| 2010/0245257 | A1* | 9/2010 | Cragun et al. ............ 345/173 |
| 2010/0287188 | A1 | 11/2010 | Kakar |
| 2010/0312780 | A1 | 12/2010 | Le Chevalier et al. |
| 2011/0035274 | A1* | 2/2011 | Goel et al. .............. 705/14.45 |
| 2011/0072390 | A1 | 3/2011 | Duga et al. |
| 2011/0074824 | A1* | 3/2011 | Srinivasan et al. ........ 345/660 |
| 2012/0151406 | A1* | 6/2012 | Oberstein ................. 715/784 |
| 2012/0297335 | A1* | 11/2012 | Ramasubramanian G06F 3/04855 715/787 |
| 2013/0007603 | A1 | 1/2013 | Dougherty et al. |
| 2013/0106913 | A1* | 5/2013 | Edmiston et al. ........... 345/660 |
| 2013/0326398 | A1* | 12/2013 | Zuverink ............. G06F 3/048 715/784 |

FOREIGN PATENT DOCUMENTS

| | | |
|---|---|---|
| WO | WO 2004/107214 A1 | 12/2004 |
| WO | WO 2007/112276 A2 | 10/2007 |

OTHER PUBLICATIONS

HTML <meta> tag, W3Schools, Feb. 2009.*
How to include another XHTML in XHTML using JSF 2.0 Facelets, Apr. 2011, www.stackoverflow.com.*
Scott Clark, Detect and Set the iPhone & iPad's Viewport Orientation Using JavaScript, CSS and Meta Tags, Jun. 2010.*
AndroidDevelopers, Targeting Screens from web Apps; Dec. 9, 2010; Android Developers; pp. 1-11. Retreived:http://web.archive.org/web/20101209030544/http://developer.android.com/guide/webapps/targeting.html.*
Evan Lenz, The WordprocessingML Vocabulary, Jun. 7, 2004, pp. 2-58 Retrieved: http://lenzconsulting.com/wordml/.*
Crisp Technical Editors, Word 2007: Basic: Crisp Comprehensive Series, Pub Date: Jan. 22, 2010; pp. 2-15.*
Basic, Tech Note 42: Using the HTML view control, Nov. 30, 2009, Basic corporation, pp. 1-3 Retrieved: https://www.nsbasic.com/ce/info/technotes/TN42.htm.*
Coyler, "Prevent iPhone Text Enlargement," CSS—Tricks, Nov. 28, 2008, http://css-tricks.com/prevent-iphone-text-enlargement/, 4 pages.
Cristi, "Android—Handling Screen Orientation," IndyVision.net, Mar. 14, 2010, http://indyvision.net/2010/03/android-handling-screen-orientation/, 4 pages.
Knight, K., "Fixed vs. Fluid Vs. Elastic Layout: What's The Right One for You?", Smashing Magazine, Jun. 2, 2009, http://coding.smashingmagazine.com/2009/06/02/fixed-vs-fluid-vs-elastic-layout-whats-the-right-one-for-you/, 20 pages.
Lemay et al., "Sams Teach Yourself Web Publishing with HTML and CSS," Sam Publishing, Aug. 2010, 6 pages.
Windows Mobile, "Layout Meta Tag," Windows Mobile 6.5, Apr. 8, 2010, http://msdn.microsoft.com/en-us/library/bb431690.aspx, 2 pages.
International Search Report and Written Opinion dated Aug. 13, 2012, received in International Application No. PCT/US2012/038978, which corresponds to U.S. Appl. No. 13/172,479, 8 pages (Dougherty).
Office Action dated Sep. 11, 2012, received in U.S. Appl. No. 13/466,957, 29 pages (Dougherty).
United States Office Action for U.S. Appl. No. 13/172,479, Dec. 22, 2014, 14 pages.
Office Action dated Sep. 5, 2013, received in U.S. Appl. No. 13/172,479, 26 pages (Dougherty).
Calhoun, D., "David Calhoun's Blog: The viewport metatag (Mobile web part 1)," May 6, 2010, 9 Pages, [online] [Retrieved on Aug. 14, 2013] Retrieved from the internet <URL:http://davidcalhoun.com/2010/viewport-metatag/>.
Roto, V., et al., "Minimap—A Web Page Visualization Method for Mobile Phones," CHI, Jun. 22, 2006, Proceedings/Mobile Surfing and Effects of Wearables, Nokia Research Center, P.O. Box 407, 00045, Nokia group, Finland, pp. 35-44.
Star, J., The 5-Minute CSS Mobile Makeover, Perishable Press, Aug. 2, 2009, 16 pages [online] [retrieved on Aug. 14, 2013] Retrieved from the internet <URL:http://perishablepress.com/the-5-minute-css-mobile-makeover/>.
W3C, "Cascading Style Sheets Level 2 Revision 1 (CSS 2.1) Specification," Jun. 7, 2011, 29 Pages, Bert Bos Tantek Celik Ian Hickson Hakon Wium Lie, http://www.w3.org/TR/CSS2/visuren.html, Visual Formatting Model Chapter 9, [online] [Archived on web.archive.org on Apr. 12, 2010] [Retrieved on Aug. 14, 2013] Retrieved from the internet <URL:http://web.archive.org/web/20100412081230/http://www.w3.org/TR/CSS2/visuren.html>.
Korean Patent Office, Office Action for KR Application No. 10-2014-7002060, Dec. 23, 2014, 12 pages.
Office Action for U.S. Appl. No. 13/172,479, May 23, 2014, 19 Pages.
Daly L., "Understanding Apple's fixed-layout EPUBs", Jan. 17, 2011, 6 pages, [Online] (Retrieved Jan. 16, 2015), Retrieved from the Internet, <https://blog.safaribooksonline.com/2011/01/17/understanding-apples-fixed-layout-epubs/>.
Umigami S.,"Review of EPUB for iBooks only", Jan. 19, 2011, 7 pages, [Online] (Retrieved: Jan. 16, 2015), Retrieved from the Internet, <http://builder.japan.zdnet.com/off-topic/sp_epub2010/20425185/>. (with English Abstract).
"Working with Apple's Fixed Format Layout", [online], Mar. 13, 2011, 5 pages, [Online], (Retrieved Jan. 16, 2015), Retrieved from the Internet, <http://www.ebookconverting.com/working-with-apples-fixed-format-layout>.
Japan Patent Office, Notification of Reason for Refusal for JP Application No. 2014-516975, Jan. 26, 2015, 6 pages.
Australia Patent Office, Patent Examination Report No. 1 for AU Application No. 2012275984, Feb. 10, 2015, 3 pages.
Office Action for U.S. Appl. No. 13/172,479, Jun. 24, 2015, 17 Pages.
Office Action for Korean Patent Application No. KR 10-2014-7002060, Sep. 1, 2015, 12 Pages.
Office Action for Chinese Patent Application No. CN 201280032383X, Oct. 10, 2015, 12 Pages.

* cited by examiner

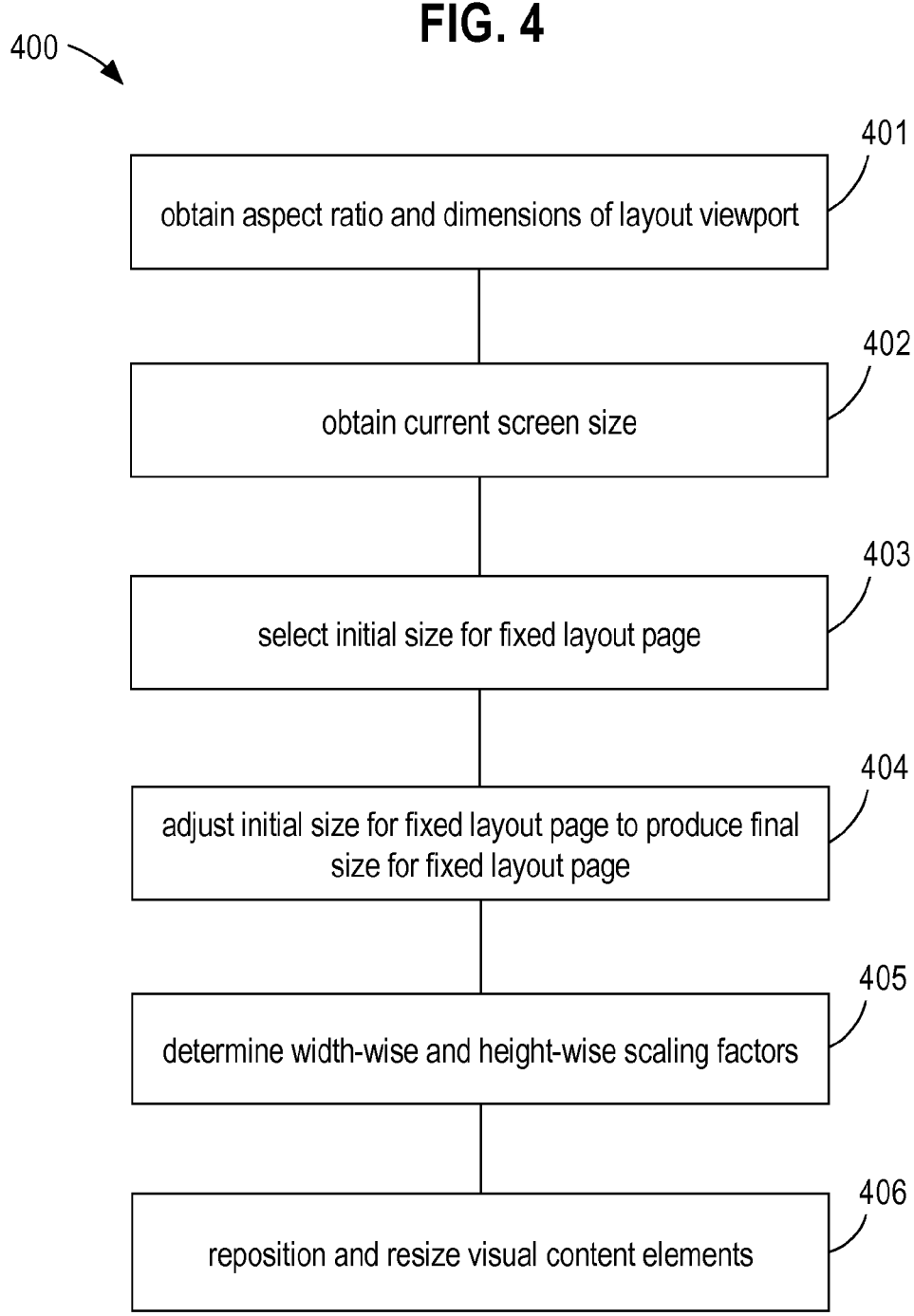

FIXED LAYOUT ELECTRONIC PUBLICATIONS

CROSS-REFERENCE TO RELATED APPLICATIONS; BENEFIT CLAIM

This application claims the benefit as a Continuation of application Ser. No. 13/172,479, filed Jun. 29, 2011 the entire contents of which is hereby incorporated by reference as if fully set forth herein, under 35 U.S.C. §120. The applicants hereby rescind any disclaimer of claim scope in the parent application(s) or the prosecution history thereof and advise the USPTO that the claims in this application may be broader than any claim in the parent application(s).

BACKGROUND

The present invention relates generally to electronic publishing, and more particularly, to publishing and rendering an electronic publication in a fixed layout.

Today, the world of electronic publications enjoys increasing consumer awareness spurred by the recent availability of consumer electronic reader devices, or e-reader devices, such as those commercially available from well-known companies such as Apple, Barnes and Noble, and Sony. Electronic publishing data format standards have been developed and are being developed to provide publishers with a standardized set of rules and instructions for publishing electronic publications for different e-reader device platforms. An example of such a standard is the Electronic Publication (EPUB) standard developed by the International Digital Publishing Forum (IDPF). A current release of the ePub standard, 2.0.1, is available online at www.idpf.org.

Current electronic publishing data format standards are designed for re-flowable content and do not inherently support fixed layouts. This means that e-reader devices following these standards move visual content (e.g., text and images) from one page to another as necessary to fit visual content to the size of the e-reader device display screen and according user preferences. For example, current standards allow users to change the font or font size of text to suit their preferences. As the font or font size changes, an e-reader device may re-flow text as necessary so that the width of a line of text is no longer than the width of the screen thereby preventing the user from having to scroll or pan horizontally to read lines of the book. This may also result in visual content on a page re-flowing to the previous or next page or visual content on the previous or next pages re-flowing to a currently displayed page. Further, to mimic the behavior of actual physical books, many e-reader devices present visual content on pages that are displayed entirely on the screen of the e-reader device so that the user is not required to scroll or pan vertically when reading. As a result, if the font or font size is changed by the user, visual content initially on one page may re-flow to another page.

The re-flowable behavior of current standards and current e-reader devices is generally acceptable to publishers when the electronic publication consists largely of text with few or no images or images that are to be presented inline within text. However, some publishers may wish to publish an electronic publication in which the layout of visual content is fixed on pages and does not re-flow inter-page. Cookbooks, travel books, photography books, children's books, and other image intensive books are examples of types of electronic publications where a fixed layout may be desirable.

One possible solution to creating a fixed layout electronic publication is to capture or create a digital image of each entire page. An e-reader device may then display each image to the reader. However, this solution is less than optimal because the text of the page captured in an image typically would not be available as text data to useful text-based capabilities of many e-reader devices such as searching, bookmarking, highlighting and passage sharing. Further, if the dimensions of an image are not proportional to the dimensions e-reader device display, the e-reader device may split the image over multiple pages resulting in an unappealing presentation of the publication.

Based on the foregoing, it is clearly desirable to help publishers create fixed layout electronic publications in which a fixed relationship between visual content and pages may be maintained in e-reader device displays and in which text content is available to the e-reader devices as text data. The present invention fulfills these and other needs.

BRIEF DESCRIPTION OF THE DRAWING(S)

FIG. 4 shows a flowchart of a sample scaling operation according to some embodiments of the invention.

DETAILED DESCRIPTION

Glossary

Figure 1:
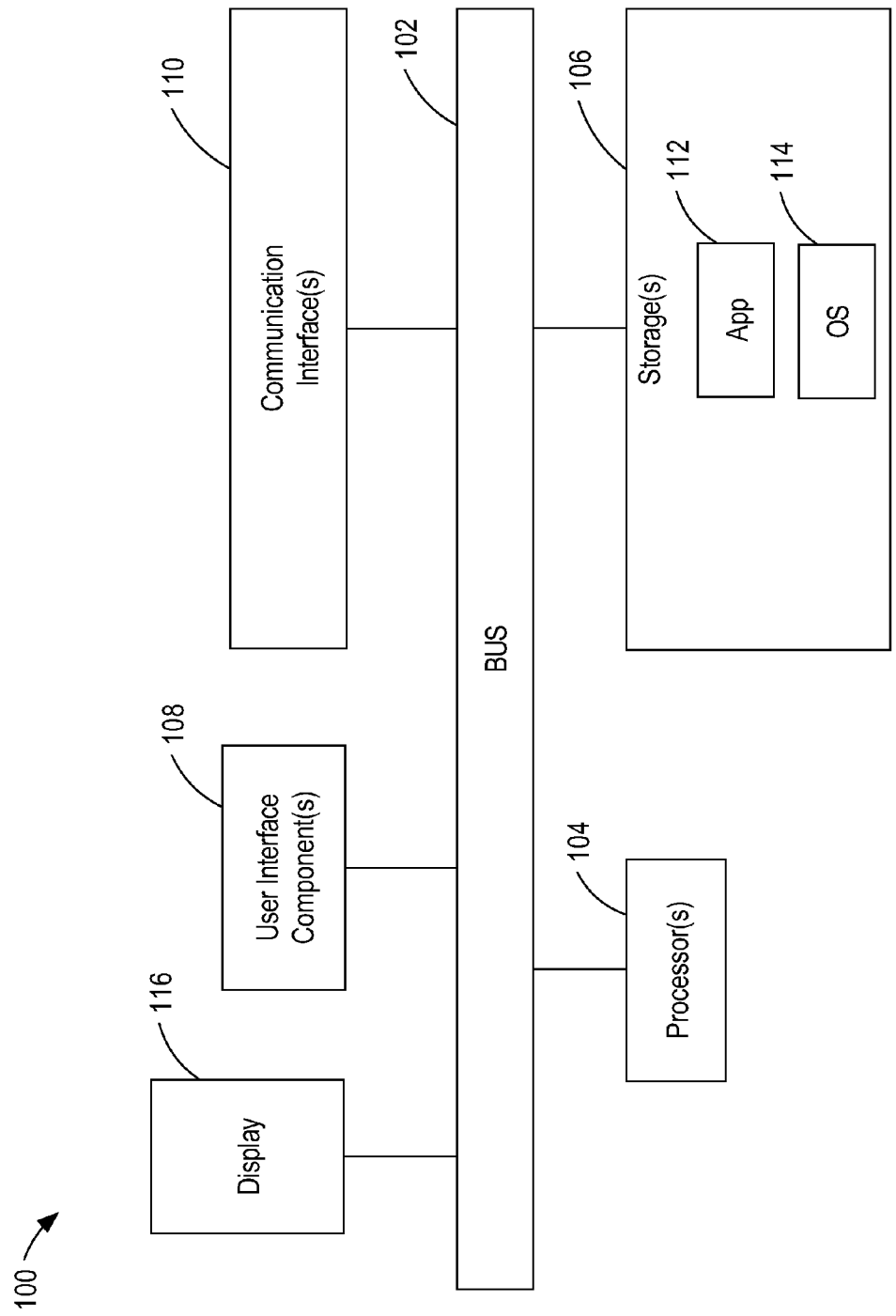
FIG. 1 shows a block diagram of a sample e-reader device in which some embodiments of the invention may be implemented.

As used herein, the term "electronic reader device", or just "e-reader device", refers to a physical platform (hardware and software) on which electronic publications are rendered. Non-limiting examples of e-reader devices include desktop computers, laptop computers, tablet computers, mobile/smart phones, dedicated e-reader devices, or any other computing device capable of or configured for rending electronic publications.

As used herein, the term "publisher", unless otherwise indicated, refers to any human creator of an electronic publication. For example, the publisher may be the copyright owner of the content of the publication or an agent creating the publication on behalf of the copyright owner.

As used herein, the term "reader", unless otherwise indicated, means a human user of an e-reader device.

In the following description, the term "visual content" broadly refers to any type of content that may be displayed as part of an electronic publication on a display screen of an e-reader device, including but not limited to text and images.

General Overview

According to some embodiments, techniques are described herein to assist a publisher to create fixed layout pages of an electronic publication. The techniques are useful for creating cookbooks, travel books, photography books, children's books, other "illustrated books", or any other electronic publication where a fixed layout for at least some of the pages of the electronic publication is desirable. With the techniques, the publisher may embed fonts, select particular fonts and font sizes, assign visual content to fixed layout pages, and precisely position visual content at fixed positions on fixed layout pages.

As used herein, the term "fixed layout electronic publication" means an electronic publication having at least one fixed layout page.

As used herein, the term "fixed layout page" means a single page or a two-page spread of an electronic publication in which visual content assigned to the page or the two-page spread does not re-flow between pages. A two-page spread is two consecutive facing pages of an electronic publication displayed side-by-side. Unless otherwise indicated or apparent from context, where "fixed layout page" is recited in the following description, either "single page fixed layout page" or "two-page spread fixed layout page" may be substituted instead. Thus, in the following description, unless otherwise indicated or apparent from context, description related to a fixed layout page applies to both a single page fixed layout page and a two-page spread fixed layout page.

According to some embodiments, an e-reader device prevents a reader from changing the font or the font size of text of a fixed layout page presented to the reader, thereby preserving the font and font size selections of the publisher. In some embodiments, if the reader zooms or magnifies a fixed layout page, the e-reader device does not re-flow visual content assigned to the fixed layout page by the publisher, thereby preserving the fixed layout choices of the publisher.

In accordance with some embodiments of the present invention, a rendering mechanism for e-reader devices is provided for automatically scaling and rendering a fixed layout page to fit an e-reader device display screen size based, at least in part, upon page size information associated with the fixed layout page. In some embodiments, the page size information is specified by the publisher when authoring the electronic publication. In some embodiments, the page size information includes a page aspect ratio and page dimensions (e.g., width and height in pixels). In this case where only both a page aspect ratio and page dimensions are specified, the aspect ratio of the page dimensions should be the same or substantially the same as the page aspect ratio. In other embodiments, the page size information includes just page dimensions and the page aspect ratio is calculated from the page dimensions. The rendering mechanism relieves the publisher from having to create multiple fixed layout pages for different e-reader devices having different display device sizes. With the techniques, the publisher can create a single fixed layout page that can be viewed in a fixed layout on all of, for example, a desktop computer, a tablet computer, and a mobile phone.

In some embodiments where the page size of a fixed layout page according to associated page size information is larger in at least one dimension (e.g., width or height) than the display screen of an e-reader device, the rendering mechanism scales the fixed layout page, including the visual content assigned to the page by the publisher, so that the fixed layout page and the assigned visual content fit entirely on the display screen. When scaling, the rendering mechanism maintains or substantially maintains the page aspect ratio and fixed layout of the fixed layout page specified by the publisher. Thus, the techniques allow a publisher to select a page aspect ratio and a fixed layout for the fixed layout page that the publisher deems is best suited for the visual content of the fixed layout page and the page aspect ratio and fixed layout will be maintained or substantially maintained by the rendering mechanism when the fixed layout page is displayed by the e-reader device.

For example, with the techniques, a publisher can create a book in which a fixed layout page is wider than taller and is filled with an image and where text on the fixed layout page is layered on the image at a fixed location relative to the fixed layout page. According to some embodiments, the rendering mechanism will scale the size of fixed layout page, the size of the image, and the size and position of the text as necessary to fit the size of the e-reader display screen, maintaining or substantially maintaining the page aspect ratio and the fixed position of the text relative to the scaled fixed layout page.

According to some embodiments, the rendering mechanism automatically scales a fixed layout page of an electronic publication in the following manner. Initially, the rendering mechanism obtains a content document authored by the publisher representing the fixed layout page. The content document is associated with or includes page size information. The content document includes or references the visual content to be displayed on the fixed layout page. In some embodiments, the content document is a HyperText Markup Language (HTML) formatted or an eXtensible HyperText Markup Language (XHTML) formatted document. Optionally, the content document includes or references instructions for precisely positioning the visual content at fixed locations on the fixed layout page. In some embodiments, a Cascading Style Sheet (CSS) is used for precise positioning. The CSS may be internal or external to the content document.

After obtaining the page size information, the rendering mechanism then selects a first page dimension and a target size for the first page dimension based, at least in part, upon the page aspect ratio and the dimensions of the e-reader device display screen. The first page dimension is selected by the rendering mechanism as either width or height such that the fixed layout page, when scaled to fit entirely on the display screen, maintains or substantially maintains the page aspect ratio.

In some embodiments, which of the width and height dimensions is selected by the rendering mechanism as the first page dimension depends on a difference, if any, between the page aspect ratio and the aspect ratio of the display screen. For example, if the page aspect ratio is larger than the screen aspect ratio and the page width is greater than the width of the display screen, then the rendering mechanism may select a target width for the fixed layout page such that the fixed layout page, when scaled for display by the rendering mechanism, fits entirely on the display screen while maintaining or substantially maintaining the page aspect ratio. On the other hand, if the page aspect ratio is smaller than the screen aspect ratio and the page height is greater than the height of the display screen, then the rendering mechanism selects a target height such that the fixed layout page, when scaled for display, may be displayed entirely on the display screen. If the page dimensions are such that the page size is smaller than the size of the display screen in both width and height, the rendering mechanism may not perform any scaling of the fixed layout page.

In some embodiments, the rendering mechanism selects a target size for the first page dimension that is as large or nearly as large as possible given the size constraints of the display screen and so that the fixed layout page is displayed entirely on the display screen while leaving room for other elements that may consume screen real estate such as, for example, another fixed layout page, if the fixed layout page is a single page fixed layout page being displayed as part of a two-page spread; toolbars, borders for fake pages and fake bindings; a small slice of the facing page; etc.

In some embodiments, the rendering mechanism is also capable of scaling visual content assigned to a fixed layout page. The visual content is scaled such that the visual content remains on the fixed layout page to which it was assigned by the publisher. In other words, the rendering mechanism does not re-flow the visual content between pages. To do so, in some embodiments, the rendering mechanism calculates a width-wise scaling factor and a height-wise scaling factor based on the page dimensions indicated by the associated page size information and the dimensions of the fixed layout page as scaled for display by the rendering mechanism. The positions and sizes of visual content assigned to the fixed layout page may then be scaled by the rendering mechanism based on the calculated scaling factors to proportionally fit the dimensions of the scaled fixed layout page.

Scaling Example

As example of scaling a fixed layout page of an electronic publication, assume the publisher has specified the dimensions of the fixed layout page as 2000 pixels wide and 2800 pixels high. Thus, the page aspect ratio is 2000 pixels/2800 pixels. In addition, assume the publisher has positioned the top-left corner of an image 1000 pixels wide and 1400 pixels high at 200 pixels from the left border of the fixed layout page and 400 pixels down from the top border of the fixed layout page. Now assume the rendering mechanism selects a scaled page width of 670 pixels based on a screen size that is 768 pixels wide and 1024 pixels high, a typical screen size for handheld tablet computers.

According to some embodiments, the scaled fixed layout page produced by the rendering mechanism of the present invention may be 670 pixels wide and 938 pixels high. The image may be scaled down to 335 pixels wide and 469 pixels high and positioned on the scaled fixed layout page so that the top left corner of the image is 67 pixels from the left border and 134 pixels from the top border of the scaled page.

Note that in this example, the aspect ratio of the scaled fixed layout page (670/938) is the same as the publisher-specified page aspect ratio (2000/2800). Further note that scaled image consumes the same percentage area of the scaled fixed layout page as the originally sized image consumed of the published-specified page size. Also note that the position of the scaled image on the scaled fixed layout page is proportional to the position of the original image on the publisher-specified fixed layout page. Thus, in this example, the page aspect ratio and the fixed layout of the fixed layout page specified by the publisher are maintained by the rendering mechanism when scaling the fixed layout page to fit the size of the display screen.

Sample E-Reader Device

With reference to FIG. 1, there is shown a block diagram of a sample e-reader device 100 in which some embodiments of the present invention may be implemented. Device 100 may be a desktop computing device, a laptop computing device, a tablet computing device, a smart phone, a dedicated electronic reading device, or the like. As shown, device 100 includes a bus 102 for facilitating information exchange, and one or more processors 104 coupled to bus 102 for executing instructions and processing information. Device 100 also includes one or more storage(s) 106 (also referred to herein as computer readable storage media) coupled to the bus 102. Storage(s) 106 may be used to store executable programs, permanent data, temporary data that is generated during program execution, and any other information needed to carry out computer processing.

Storage(s) 106 may include any and all types of storages that may be used to carry out computer processing. For example, storage(s) 106 may include main memory (e.g. random access memory (RAM) or other dynamic storage device), cache memory, read only memory (ROM), permanent storage (e.g. one or more magnetic disks or optical disks, flash storage, etc.), as well as other types of storage. The various storages 106 may be volatile or non-volatile. Common forms of computer readable storage media include, for example, a floppy disk, a flexible disk, hard disk, magnetic tape, or any other magnetic medium, a CD-ROM, DVD, or any other optical storage medium, punchcards, papertape, or any other physical medium with patterns of holes, a RAM, a PROM, an EPROM, a FLASH-EPROM or any other type of flash memory, any memory chip or cartridge, and any other storage medium from which a computer can read.

As shown in FIG. 1, storage(s) 106 store at least several sets of executable instructions, including an operating system 114 and an application 112. The processor(s) 102 execute the operating system 114 to provide a platform on which other sets of software may operate, and execute the application 112 to provide additional, specific functionality. For purposes of the present invention, the application 112 may be any type of application that renders electronic publications on a screen of display device 116.

In some embodiments, the functionality described herein is provided at least in part by the application 112. The application 112 may invoke the services of the operating system 114 to provide some of the functionality. For example, when the application 112 has a fixed layout page of an electronic publication to scale and render, the application 112 may invoke services of the operating system 114 to determine device-specific information such as the current aspect ratio, size, dimensions, orientation, etc. of the screen on display device 116. The application 112 may then use the device-specific information to scale the fixed layout page and the visual content assigned to it. The application 112 may invoke another service of the operating system 114 to actually render the scaled fixed layout page and the scaled visual content on the screen of the display device 116. As an alternative, the application 112 may provide the fixed layout page and the visual content to the operating system 114, and ask the operating system 114 to scale and render the fixed layout page and the visual content according to parameters determined by the operating system 114. As an alternative to having the operating system 114 provide scaling and rendering functionality, the functionality may instead be provided by the application 112 itself. As a further alternative, the functionality may be provided by a combination of or cooperation between the operating system 114 and one or more other applications (not shown). All such possible divisions of functionality are within the scope of the present invention.

The device 100 further comprises one or more user interface components 108 coupled to the bus 102. These components 108 enable the device 100 to receive input from and provide output to a user. On the input side, the user interface components 108 may include, for example, a keyboard/keypad having alphanumeric keys, a cursor control device (e.g. mouse, trackball, touchpad, etc.), a touch sensitive screen, a microphone for receiving audio input, etc. On the output side, the components 108 may include a graphical interface (e.g. a graphics card) and an audio interface (e.g. sound card) for providing visual and audio content. The user interface components 108 may further include a display device 116, a set of speakers, etc., for presenting the audio and visual content to a user. In one embodiment, the operating system 114 and the application 112 executed by the processor(s) 104 may provide a software user interface that takes advantage of and interacts with the user interface components 108 to receive input from and provide output to a user. This software user interface may, for example, provide a menu that the user can navigate using one of the user input devices mentioned above.

Different devices 100 may have different size display devices 116. Thus, the available screen space for rendering electronic publications on a display device 116 may vary from device 100 to device 100. Further, the aspect ratio and the dimensions of the screen of a display device 116 may vary from device 100 to device 100. Still further, in portable devices 100 that rotate the orientation of the screen depending on the physical orientation of the display device 116, the aspect ratio and dimensions of the screen of a display device 116 may vary depending on whether the screen is currently in landscape orientation (wider than taller) or currently in portrait orientation (taller than wider).

In addition to the components set forth above, the device 100 further comprises one or more communication interfaces 110 coupled to the bus 102. These interfaces 110 enable the device 100 to communicate with other components. The communication interfaces 110 may include, for example, a network interface (wired or wireless) for enabling the device 100 to send messages to and receive messages from a network. The communications interfaces 110 may further include a wireless interface (e.g. Bluetooth) for communicating wirelessly with nearby devices, and a wired interface for direct coupling with a compatible local device. Furthermore, the communications interfaces 110 may include a 3G interface for enabling the device to access the Internet without using a local network. These and other interfaces may be included in the device 100.

Fixed Layout Electronic Publication

In some embodiments, a fixed layout electronic publication is a specially constructed compressed file archive. The file archive may be in any suitable compressed file archive format such as, for example, the widely used .zip format or other format suitable to the requirements at hand. The fixed layout publication may contain, among other configuration files, a number of content documents created by the publisher.

In some embodiments, a fixed layout electronic publication is backward compatible with a re-flowable electronic publishing standard such that a non-capable e-reader device that does not support fixed layout features of the present invention but does support the re-flowable standard can still present the electronic publication (but in a reflowable form). The fixed layout electronic publication may not be presented by these non-capable e-readers devices in a fixed layout as intended by the publisher. Nonetheless, by being backward compatible with the reflowable standard, the fixed layout publication can still be presented by these non-capable e-reader devices in a readable form. In some embodiments, the reflowable standard to which backward compatibility is provided is a current version of the Electronic Publication (EPUB) standard as set forth by the International Digital Publishing Forum (IDPF). Backward compatibility may be maintained with draft and future versions of the EPUB standard and such versions are contemplated as being within the scope of the invention.

Content Documents

In some embodiments, a content document of a fixed layout electronic publication represents one of: (1) a fixed layout page (i.e., a single page fixed layout page or a two-page spread fixed layout page) or (2) re-flowable content. Each content document of a fixed layout electronic publication contains or references visual content (e.g., text and images) of the electronic publication. If a content document represents a fixed layout page, then the visual content of the content document does not re-flow between pages. If the content document represents re-flowable content, then some or all of the visual content of the content document may be displayed on a single page and may re-reflow between pages. Thus, in some embodiments, the electronic publication format of the present invention can be flexibly used by publishers to create electronic publication presenting a mix of fixed layout pages and re-flowable content. The electronic publication format can also be used to create an electronic publication presenting all fixed layout pages. In some embodiments, each content document is formatted according to a web presentation language such as HyperText Markup Language (HTML) or eXtensible HyperText Markup Language (XHTML).

According to some embodiments, visual content of a content document may be precisely positioned by the publisher at fixed locations on a fixed layout page. In some embodiments, visual content is precisely positioned using a Cascading Style Sheet (CSS). The CSS may be a separate file referenced from within the content document or the CSS may be included directly in the content document. Thus, the CSS may be considered to be part of the content document. Example content documents and examples of using CSS for precisely positioning visual content on fixed layout pages are provided below.

Example Electronic Publication

Figure 2:
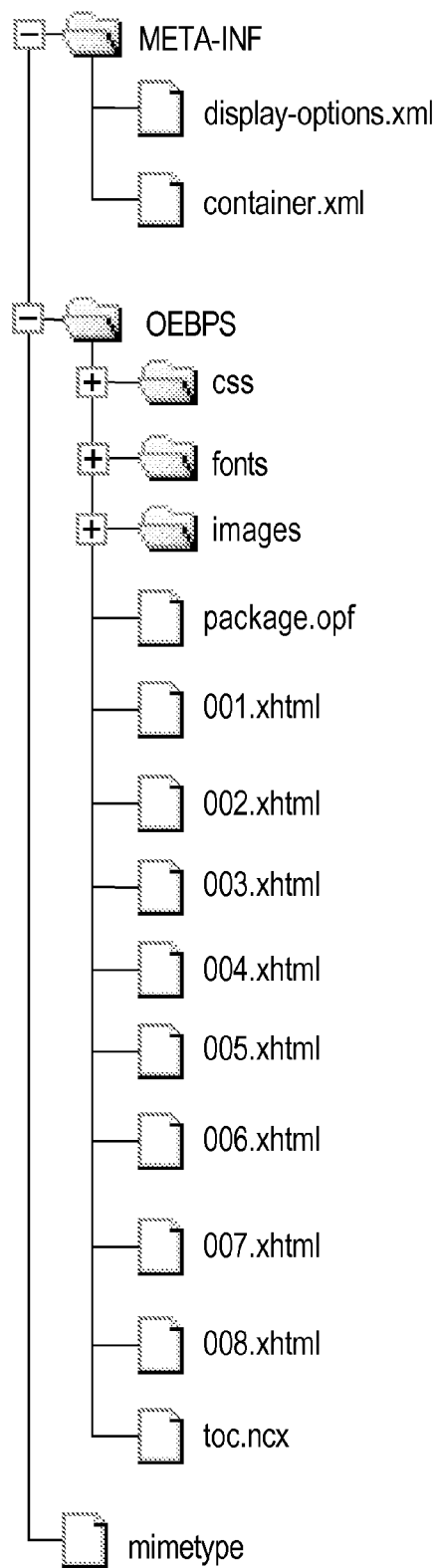
FIG. 2 shows a hierarchical file system view of an example electronic publication according to some embodiments of the invention.

FIG. 2 provides a hierarchical file system view of an example electronic publication according to some embodiments of the invention. The example publication contains two top-level folders "META-INF" and "OEBPS" and a "mimetype" file. The META-INF folder contains the "display-options.xml" and the "container.xml" configuration files. The OEBPS folder contains sub-folders "css", "fonts", and "images" containing CSS data, font data, and image data respectively. The OEBPS folder also contains content documents "001.xhtml" through "008.xhtml" and configuration files "package.opf" and "toc.ncx".

The file and folder layout of the example publication of FIG. 2 is based on a current version of the Open Container Format (OCF) as set forth by the International Digital Publishing Forum (IDPF) but with extensions to support fixed layout electronic publications and other configuration options as described herein. Accordingly, the following discussion focuses primarily on the extensions and the configuration options. Draft and future versions of the OCF as well as other similar electronic publishing container formats based on the Open eBook Publication Structure (OEBPS) are contemplated as being within the scope of the invention and may serve as a basis for the extensions and configuration options described herein.

Further, not all files and folder listed in FIG. 2 are required of the invention. For example, an electronic publication that does not embed any fonts may not include the "fonts" sub-folder. Further, the names of the files and folders are largely arbitrary and may vary from implementation to implementation according to the requirements at hand. For example, the OEBPS folder is arbitrarily named in the example layout of FIG. 2. However, in some cases, a particular name for a file or folder may be used to maintain backward compatibility with a re-flowable electronic publishing standard. Still further, where separate folders are shown in FIG. 2, such separation may not be required. For example, images and font data could be stored in the same folder. Still further, other files not listed in FIG. 2 may be included in an electronic publication. For example, the META-INF folder may contain other configuration files that describe the contents, configuration, metadata, signatures, encryption, rights, and other information about the electronic publication.

Display-Options.xml Configuration File

In some embodiments, an electronic publication includes a "display-options.xml" configuration file. In some embodiments, the display-options.xml configuration file has a file name of "display-options.xml". However, this file name is not required of the invention and other names may be used.

In some embodiments, upon obtaining the electronic publication, an e-reader device, such as device 100, may read and parse the display-options.xml to access the configuration parameters specified within. The e-reader device may present the electronic publication to the reader in accordance with the configuration. In some embodiments, the configuration data is formatted in eXtensible Markup Language (XML).

In some embodiments, the display-options.xml configuration file provides a number of configuration options to the publisher for configuring the contained electronic publication. In some embodiments, the display-options.xml configuration file specifies whether the electronic publication is to be treated as a fixed layout electronic publication or a re-flowable electronic publication. Other options allow the publisher to fine tune how the electronic publication is displayed on different devices and in different situations.

An example display-options.xml file is:

```
0: <?xml version="1.0" encoding="UTF-8"?>
1: <display_options>
2:   <platform name="*">
3:     <option name="fixed-layout">true</option>
4:     <option name="open-to-spread">true</option>
5:   </platform>
6:   <platform name="phone">
7:     <option name="orientation-lock">landscape-only</option>
8:   </platform>
9: </display_options>
```

For example, at line 3 in the above-example display-options.xml configuration file, the "option" tag with a name of "fixed-layout" and the value "true" is specified to indicate that the contained electronic publication is to be treated as fixed layout electronic publication. This means that the e-reader device may, when displaying the electronic publication, disable certain e-reader device configuration options that may not be appropriate for a fixed layout electronic publication such as the ability to change fonts or font sizes. This also means that the e-reader device will determine, when rendering a content document of the electronic publication, whether the content document should be rendered as a fixed layout page or as a re-flowable document. In some embodiments, this determination is made based on page size information associated with the content document. If the "fixed-layout" option is missing or the value is other than "true", then the e-reader device renders each content document of the contained publication as a re-flowable document, even if the content document is associated with page size information.

Locking the Screen Orientation

Many of today's e-reader devices are human-portable handheld computer devices that include a rectangular display device. The e-reader devices typically include an accelerometer for detecting when the physical orientation of the display device is no longer aligned with the current orientation of the screen of the display device. In response to detecting this misalignment, these e-reader devices may rotate the screen so that the screen orientation is re-aligned with the display device's physical orientation. At a given time, the screen may be in one of two orientation modes, landscape or portrait. In landscape orientation mode, the bottom and top of the screen run parallel to the longer edges of the display device, regardless of the display device's physical orientation. In portrait orientation mode, the bottom and top of the screen run parallel to the shorter edges of the display device, regardless of the display device's physical orientation.

With current e-reader devices, a change in the physical orientation of the e-reader's display device may result in a change in the orientation of the screen from landscape to portrait or from portrait to landscape. With re-flowable visual content, this change in screen orientation ordinarily does not cause presentation problems because the e-reader device is able to reflow the visual content as needed to adjust to the new screen orientation. However, with a fixed layout electronic publication, visual content of a content document may not re-flow, and thus, a fixed layout page that is readable in one screen orientation may not be readable or as readable when presented to the reader in the other screen orientation. For example, text on a fixed layout page may be more readable when the fixed layout page is displayed in portrait orientation than when displayed in landscape orientation, especially if the display device is much taller than wider. As a result, the publisher may wish to prevent the fixed layout page from being displayed in landscape orientation.

Accordingly, in some embodiments, the display-options.xml configuration file provides a way for the publisher to lock the screen in a particular orientation regardless of the physical orientation of the e-reader device's display device. For example, at line 7 in the above-example display-options.xml configuration file, the "option" tag with a name "orientation-lock" and the value "landscape-only" is specified to indicate the display screen is always to be displayed in landscape orientation on the designated e-reader device platforms. Thus, when a designated e-reader device enters a second physical orientation mode from a first physical orientation mode that would otherwise cause the e-reader device to rotate the screen display from a first orientation (e.g., landscape) to a second orientation (e.g., portrait), the e-reader device maintains the screen display in the first orientation (e.g., landscape).

In some embodiments, instead of the "landscape-only" value, the "orientation-lock" option may specify the value "portrait-only" to indicate that the display screen is always to be displayed in portrait orientation. In some embodiments, if the "orientation-lock" option is omitted or specified with a value of "none", then the e-reader device is allowed to rotate the screen between landscape and portrait orientation depending on the physical orientation of the device.

Controlling the Initial Display

In some embodiments, the display-options.xml file allows the publisher to specify how the contained fixed layout electronic publication should initially be displayed when the reader opens the publication in an e-reader device. In some embodiments, two initial display options are available: single-page spread and two-page spread. In a single-page spread, the screen of the e-reader comprises largely a single page (a small slice of the facing page and/or other border elements may be visible). In a two-page spread, the screen presents two consecutive facing pages side by side. For example, at line 4 in the above-example display-options.xml configuration file, the "option" tag with a name "open-tospread" and the value "true" is specified to indicate that the contained electronic publication is to be initially displayed in a two-page spread on the designated e-reader device platforms. In some embodiments, a value other than "true", of if the "open-to-spread" option is omitted, indicates that the contained publication is to be initially displayed in a single-page spread on the designated e-reader device platforms.

A two-page spread may be a more optimal display for certain types of fixed layout books such as children's books, picture books, etc. where two consecutive facing pages are often intended by the publisher to be presented to the reader at the same time. In some embodiments, a combination of the "open-to-spread" and "orientation-lock" options is used to maintain display of a fixed layout publication in a two-page spread landscape orientation. This combination may be used to provide a reading experience similar to reading an actual physical book.

Note that the "open-to-spread" option is independent of whether content documents are treated as fixed layout pages or reflowable content. For example, where the "option-to-spread" option is "true", two consecutive single page fixed layout pages corresponding to two consecutive content documents of the publication may be initially displayed, a two-page spread fixed layout page corresponding to a single content document may be initially displayed, or two consecutive pages presenting visual content from one or more re-flowable content documents may be initially displayed.

Controlling for Different E-Reader Device Platforms

In some embodiments, the display-options.xml configuration file allows the publisher to specify configuration options on a per-e-reader platform basis in addition to or instead of specifying options that are applicable to all e-reader device platforms. For example, the above example display-options.xml specifies that the contained publication is to be locked to landscape orientation only on "phone" e-reader device platforms as indicated by the "orientation-lock" option tag contained within the "phone" platform tag. It also specifies that the contained publication is to be treated as a fixed layout publication initially opened to a two-page spread on all e-reader device platforms as indicated by the "fixed-layout" and "orientation-lock" option tags contained within the platform tag specifying the name "*". The asterisk is used to denote that the contained options apply to all e-reader device platforms.

Specific e-reader device platforms may be identified in the platform tag using any convenient notation. When an e-reader device reads a display-options.xml file for the purpose of configuring a contained electronic publication, the e-reader device evaluates the value of the "name" attribute of any "platform" tag in the display-options.xml file to determine whether the options contained within the platform tag apply to it. The value may identify a particular e-reader device, a group of e-reader devices, or a class of e-reader devices. The particular syntax of the value and the range of possible values may vary from implementation to implementation according to the requirements at hand. For example, the value "phone" in the above example display-options.xml is used to identify a class of e-reader devices and each e-reader device in the class may comprise logic for determining whether they belong to the class, and hence, whether the configuration options contained with the "phone" platform tag apply to it. Thus, embodiments of the invention are not limited to any particular values for the "name" attribute of a "platform" tag.

Layout Viewport

As mentioned, in some embodiments, the publisher may author a content document of an electronic publication in which the visual content of the content document has a fixed layout on a fixed layout page. The fixed layout page has an aspect ratio and initial dimensions (e.g., width and height in pixels) as set by size information associated with the content document within the publication. This size information may be specified by the publisher when authoring the content document. The aspect ratio and initial dimensions set by the size information associated with the content document is referred to herein as the content document's "layout viewport".

In some embodiments, when a content document is displayed by an e-reader device as a fixed layout page, the layout viewport of the content document dictates the aspect ratio of the scaled fixed layout page and the proportional size of the visual content displayed on the scaled fixed layout page. For example, according to some embodiments of the invention, if the layout viewport for a content document as set by the publisher is 1000 pixels wide by 1400 pixels high and the content document references an image that measures 1000 pixels wide by 1400 pixels high, then the image will fill the entire scaled fixed layout page. However, if the layout viewport is set by the publisher at 2000 pixels wide by 2800 pixels high, then that same image will fill only half of the scaled fixed layout page.

A number of factors may affect the publisher's choice of an aspect ratio and dimensions for the layout viewport including, for example, whether the ideal orientation for the corresponding fixed layout page is landscape or portrait, other visual elements that consume screen real estate (toolbars, borders, etc.), whether the ideal viewing spread is single-page or two-page, etc.

Specifying the Aspect Ratio and Dimensions of the Layout Viewport

Aspect Ratio:

In some embodiments, the publisher specifies the aspect ratio of the layout viewport for a content document by including, in the electronic publication, metadata that specifies the aspect ratio of the layout viewport or from which the aspect ratio may be determined by the e-reader device. According to some embodiments, the aspect ratio of the layout viewport is specified by the publisher using the HTML or XHTML "<meta>" element within the content document.

In some embodiments, the "<meta>" element is used with a "name" attribute having the value "viewport" and a "content" attribute having a value of the form "width=X, height=Y", where X and Y are unit-less numerical values indicating the aspect ratio. Other variants for indicating the aspect ratio are possible using the "<meta>" and all such variants are within the scope of the present invention. For example, the value of the "content" attribute could be a single value expressing the aspect ratio as a number, fraction, or diagonal length of the layout viewport. The following is an example of an XHTML "<meta>" viewport element indicating an aspect ratio of 792/612 for the layout viewport:

```
<meta name="viewport" content="width=792, height=612" />
```

Dimensions:

In some embodiments, the publisher specifies the dimensions (e.g., width and height in pixels) of the layout viewport for a content document by including, in the electronic publication, metadata that specifies the dimensions of the layout viewport or from which the dimensions may be determined by the e-reader device. According to some embodiments, the dimensions the publisher specifies for the "<body>" element of a HTML or XHTML formatted content document also specifies the dimensions of the layout viewport for the content document. For example, the following CSS declaration specifies dimensions for the "<body>" element at 792 pixels wide and 612 pixels high. This example CSS declaration may be included in or referenced by each content document of the fixed electronic publication to specify the dimensions of the layout viewport at 792 pixels wide and 612 pixels high for that content document.

```
1: body {
2:     width: 792 px;
3:     height: 612 px;
4: }
```

While the aspect ratio and the dimensions of the layout viewport for a content document may be specified separately within an electronic publication as in the examples above. In other embodiments, the same metadata specifies both the aspect ratio and the dimensions. For example, in some embodiments, the HTML or XHTML "<meta>" tag may be used to specify both the aspect ratio and the dimensions. For example, the value of the "content" attribute of the "<meta>" viewport element could represent both the aspect ratio and the width and height of the layout viewport. As another example, in other embodiments, the dimensions specified for the HTML or XHMTL "<body>" element are used to specify both the aspect ratio and the dimensions of the layout viewport. Where the aspect ratio and the dimensions of the layout viewport are specified separately for a content document, typically the aspect ratio of the specified dimensions of the layout viewport is equal or substantially equal to the specified aspect ratio of the layout viewport.

Content Document Examples

As mentioned above, in some embodiments, a content document of an electronic publication is treated by an e-reader device as a fixed layout page. In addition, the content document may be authored by the publisher to precisely position visual content of the content document at fixed positions on the fixed layout page. To do so, the publisher may use the layout viewport as a positioning reference.

In some embodiments, each content document is HTML or XHTML formatted and CSS is used to precisely position visual content. The CSS may be included within the content document. Alternatively, the content document may reference the CSS stored in another file. In both cases, the CSS is considered to be part of the content document.

The following is an example of XHTML formatted content document. In this example the aspect ratio of the layout viewport is specified at line 5. The dimensions of the layout viewport are specified in a separate CSS referenced at line 8. The visual content assigned to the fixed layout page includes an image (line 12) and text (lines 13 and 14). A stylesheet for precisely positioning the visual content on the layout viewport is referenced at line 8.

```
1: <?xml version="1.0" encoding="UTF-8"?>
2: <!DOCTYPE html PUBLIC "-//W3C//DTD XHTML 1.1//EN"
  "http://www.w3.org/TR/xhtml11/DTD/xhtml11.dtd">
3: <html xmlns="http://www.w3.org/1999/xhtml">
```

-continued

```
4:     <head>
5:        <meta name="viewport" content="width=792, height=612" />
6:        <meta content="text/html; charset=UTF-8"/>
7:        <title>Fixed Layout Example</title>
8:        <link href="css/stylesheet.css" type="text/css" rel="stylesheet"/>
9:     </head>
10:    <body>
11:       <div class="page001">
12:          <img src="images/page001.jpg" alt="alternating images of waves"/>
13:          <h1>Lorem<br/>Ipsum</h1>
14:          <h2>Consectetur Adipiscing Elit</h2>
15:       </div>
16:    </body>
17: </html>
```

The following shows relevant portions of the stylesheet referenced at line 8 of the example content document above. In this example, the body of the fixed layout page is specified to have dimensions with an aspect ratio that is the same as the specified aspect ratio of layout viewport at line 5 above. The top-left corner of the image is positioned absolutely at 100 pixels from the top border of the layout viewport and 100 pixels from the left border of the layout viewport. The text starts at 400 pixels from the top border of the layout viewport and 200 pixels from the left border of the layout viewport.

```
1: body {
2:     width: 792 px;
3:     height: 612 px;
4:     margin: 0;
5: }
6: img {
7:     position: absolute;
8:     top: 100 px;
9:     left: 100 px;
10: }
12: h1, h2 {
13:    position: relative;
14:    padding: 0;
15:    top: 400 px;
16:    left: 200 px;
17: }
```

Examples will now be described that illustrate how a publisher may use HTML/XHTML and CSS to precisely position visual content of content document on a fixed layout page using the layout viewport as a positioning reference.

Positioning Text on a Fixed Layout Page:

In some embodiments, text is precisely positioned on a fixed layout page by positioning the text at an absolute position on the layout viewport relative to the position of the <body> element on the layout viewport as in the above-example XHTML formatted content document and associated CSS instructions. In the above example, since the body element is specified with a margin of 0 and the h1 and h2 text elements are specified with a padding of 0, the text starts at 400 pixels from the top border of the layout viewport and 200 pixels from the left border of the layout viewport.

Positioning an Image on a Fixed Layout Page:

In some embodiments, an image is precisely positioned on a fixed layout page using the "position:absolute" CSS instruction. The image is then positioned on the layout viewport with pixel offsets. For example, the "top" and "left" CSS properties may be used to set the top left corner of the image on the layout viewport. In the following example, the top-left corner of the image is positioned absolutely at 100 pixels from the top border of the layout viewport and 100 pixels from the left border of the layout viewport.

```
1: img {
2:      position: absolute;
3:      top: 100 px;
4:      left: 100 px;
5: }
```

Filing a Fixed Layout Page With an Image:

In some embodiments, to fill a fixed layout page with an image, the publisher creates an image having the same pixel dimensions as the specified dimensions of the layout viewport. The publisher then uses CSS instructions to position the top-left corner of the image at the top-left corner of the layout viewport. For example, consider a layout viewport having the dimensions 792 pixels wide and 612 pixels high, the following CSS instructions may be used to force an image of the same size to fill the page:

```
1: img {
2:      position: absolute
3:      height: 612 px;
4: }
```

Layering Text on an Image:

In some embodiments, the "z-index" CSS instruction is used by the publisher to insure that an image positioned on a fixed layout page stays behind text layered on top of the image. For example, for text with a default z-index value of 0, the following CSS instructions insure that the image will be displayed behind the text:

```
1: img {
2:      position: absolute
3:      height: 612 px;
4:      z-index: −1;
5: }
```

Spanning an Image over a Two-Page Spread:

In some embodiments, a fixed layout page may be created in which a single image appears to span a two-page spread.

In some embodiments, this may be accomplished as follows: the publisher creates two content documents: one for a single page fixed layout page for the left-side of the two-page spread and one for a single page fixed layout page for the right-side of the two-page spread. The publisher sizes the image so that the image is the same height as the layout viewports for the two content documents (which should be the same or approximately the same size) but twice as wide. The publisher authors the left-side content document to display the left-half of the image and authors the right-side content document to display the right half of the image. Specifically, the left-side content document is authored to position the top-left corner of a first copy of the image in the top-left corner of the layout viewport for the left-side content document and the right-side content document is authored to position the top-right corner of a second copy of the image in the top-right corner of the layout viewport for the right-side content document. The CSS "overflow" property with a value of "hidden" may be used to hide the right-half of the left single page fixed layout page image and the left-half of the right single page fixed layout page image.

The result is a two-page spread in which a single image appears to span both fixed layout pages.

In other embodiments, a two-page spread fixed layout page may be created in which a single image appears to span a two-page spread by authoring a single content document and sizing the image to be the same as the size of the layout viewport for the content document. When the content document is displayed a two-page spread fixed layout page, the image will appear to span the two-page spread.

These two-page spread spanning techniques may be useful for an "illustrated" or "picture" book in which facing pages are intended by the publisher to be viewed together.

Embedding Fonts

In some embodiments, for a fixed layout page, the e-reader device may not allow the reader to change the font or font size of text displayed on the fixed layout page to preserve the font and font size choices of the publisher. Thus, a publisher, when creating a fixed layout page, may choose fonts and font sizes for text displayed on fixed layout page to the publisher's liking.

Typically, an e-reader device will have pre-installed a set of common fonts. This means that data for rendering these common fonts is provided by the e-reader device (e.g., as part of the operating system 114) and does not need to be included in the fixed layout publication itself. To use one of these common fonts in a fixed layout publication, the publisher simply references the font by name in content documents of the publication.

However, in some cases, a publisher may wish to use a font for which font rendering data is not pre-installed on the e-reader device. In some embodiments, a publisher can embed a custom font in a fixed layout publication and apply the embedded font to text of the publication. To do so, the publisher includes a font file for the font in the electronic publication, declares the name of the font and the location of the font file in a content document, and applies the font to text according to the declaration.

In some embodiments, the font file may be any OpenType (OFT) or TrueType (TTF) font file. However, embodiments are not limited to any particular type of font file. In some embodiments, the font name and font file location is declared using the CSS "@font-face" rule and the embedded font is applied to text by referencing the font by the declared name.

Sample Rendering Operation

Figure 3:
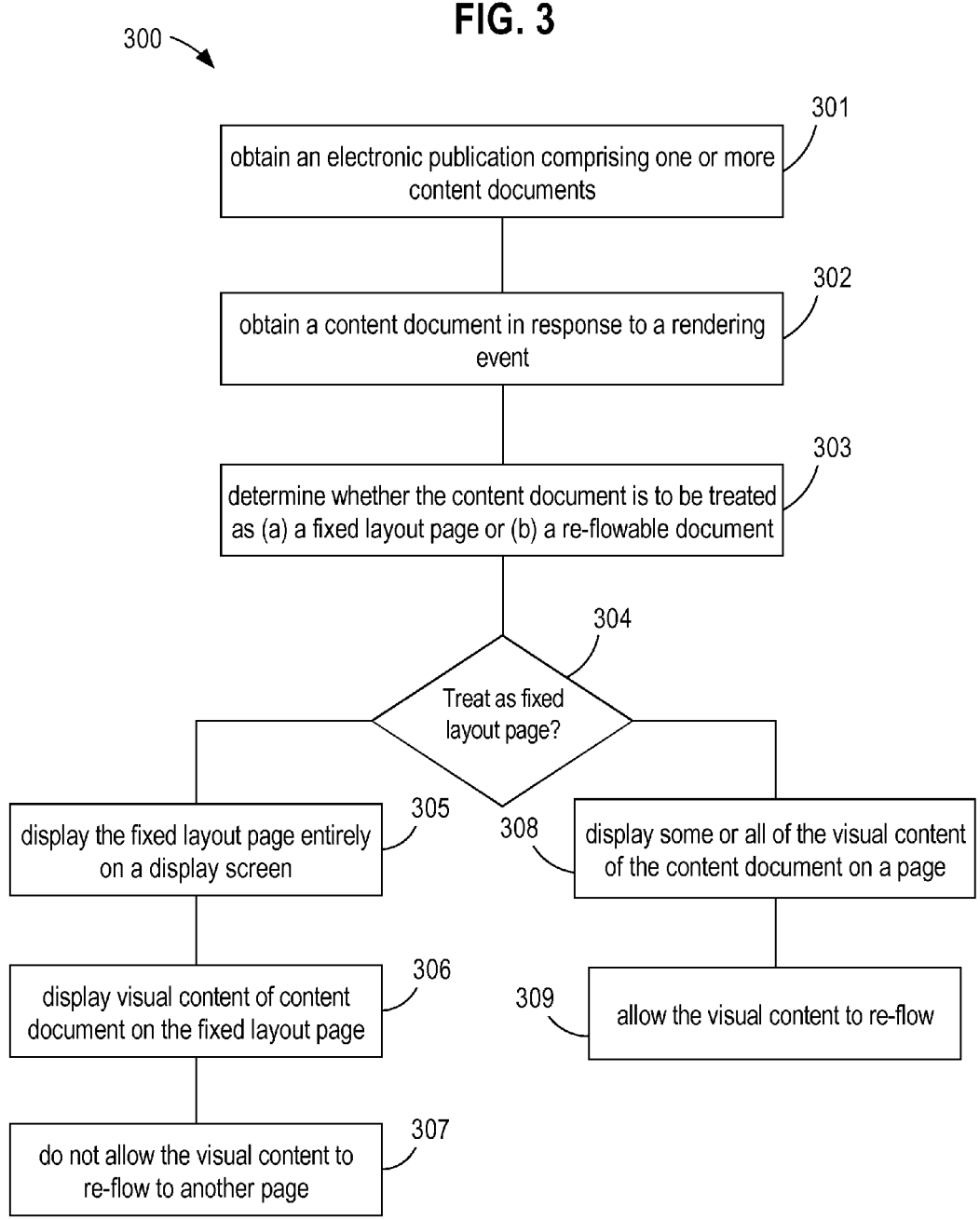
FIG. 3 shows a flowchart of a sample rendering operation according to some embodiments of the invention.

With the above discussion in mind, a sample rendering operation of device 100 with reference to FIG. 3 will now be described. In the example below, the operation is described as being performed by device 100. The device 100 may comprise one or more logic elements for performing the operation. The logical elements may be implemented entirely in software, entirely in hardware, or a combination of software and hardware. In one particular embodiment, the operation is performed by the application 112 of device 100 in cooperation with the operating system 114 of device 100.

Initially, the device 100 obtains (block 301) an electronic publication comprising one or more content documents. The device 100 may obtain the electronic publication in a number of different ways and embodiments of the invention are not limited to any particular manner of obtaining the electronic publication. In one embodiment, the device 100 obtains the electronic publication from a remote resource such as a web server over a data network such as the Internet. For example, the device 100 may obtain the electronic publication after a reader has purchased and downloaded the electronic publication from an online bookstore. As another example, the device 100 may obtain the electronic publication from a removable data storage device operatively coupled to the device 100.

In some embodiments, the obtained electronic publication is a file archive. For example, the electronic publication may be a .ZIP file or other file archive file type. In response to obtaining the electronic publication, the device 100 extracts the electronic publication to a storage 106. As a result, the content documents and any configuration files of the electronic publication are laid out on the storage 106, arranged in a file system hierarchy such as the file system hierarchy of FIG. 2 where each file including each content document of the electronic publication is individually accessible to the device 100.

In other embodiments, the electronic publication is obtained as a series or collection of files which are stored by the device 100 on a storage 106 and arranged by the device 100 in a file system hierarchy such as the file system hierarchy of FIG. 2 where each file including each content document of the electronic publication is individually accessible to the device 100.

In some embodiments, after obtaining the electronic publication, the device 100 determines how to treat the electronic publication (i.e., fixed layout or re-flowable) and other configuration options. For example, the device 100 may read and parse the display-options.xml configuration file or other configuration file of the publication to determine whether the electronic publication is to be treated as a fixed layout publication or a re-flowable publication, whether the screen orientation is to be locked or not, or whether the publication is initially to be opened to a single-page spread or a two-page spread. The rest of this example assumes that the electronic publication is to be treated as a fixed layout electronic publication.

In some embodiments, determining that the electronic publication is to be treated as a fixed layout electronic publication means one or both of the following:

(1) for each content document of the electronic publication, the device 100 will determine whether the content document is to be treated as (a) a fixed layout page or (b) a re-flowable document;

(2) at least when fixed layout pages are displayed, the device 100 disables the ability of the reader to change the font or font size of displayed text.

As mentioned, in some embodiments, a content document of a fixed layout publication may be rendered as a fixed layout page or a re-flowable document. Before rendering the content document, the device 100 determines (block 303) whether the content document is to be treated as fixed layout page or a re-flowable document. Before this determination, the device 100 obtains (block 302) the content document in response to a rendering event. The rendering event may be any event within the device 100 which causes the content document to be rendered. Typically, but not always, the rendering event is triggered by an input from a reader (user) of the device 100 Non-limiting examples of a rendering event which may cause the device 100 to obtain the content document include the reader opening the electronic publication, the reader turning a page of the publication, the reader causing the orientation of the screen to change from landscape to portrait or from portrait to landscape by, for example, changing the physical orientation of the device 100 display 116, and the reader causing the display of the publication to switch from a single-page spread to a two-page spread or from a two-page spread to a single-page spread by, for example, adjusting a configuration operation accessible via a graphical user interface.

After obtaining the content document, the device 100 determines (block 303) whether the content document is to be treated as (a) a fixed layout page or (b) a re-flowable document. This determination may be made based on explicit configuration, may be inferred by the device 100, or based on a combination of explicit configuration and inference. For example, configuration data associated with the content document, either in a configuration file or within the content document itself, may indicate how the content document is to be treated. Alternatively, the device 100 may infer how the content document is to be treated from metadata associated with the content document. For example, the device 100 may determine that the content document is to be treated as a fixed layout page by the presence of the "<meta>" viewport element in the content document. Conversely, the device 100 may determine that the content document is to be treated as a re-flowable document in the absence of the "<meta>" viewport element in the content document.

In some embodiments, where the device 100 determines that the content document is to be treated as a fixed layout page, the device 100 additionally determines whether the content document is to be treated as a single page fixed layout page or a two-page spread fixed layout page. Again, this determination can be made based on explicit configuration associated with the content document, inferred from the content document itself, or combination of configuration and inference.

If the content document is to be treated as a fixed layout page, then the content document is rendered as a fixed layout page displayed (block 305) entirely on the screen of the display 116. In particular, if the content document is to be treated as a single page fixed layout page, then the content document is rendered as a single page fixed layout page displayed (block 305) entirely on the screen of the display 116. On the other hand, if the content document is to be treated as a two-page spread fixed layout page, then the content document is rendered as a two-page spread fixed layout page displayed (block 305) entirely on the screen of the display 116.

When a content document is rendered as a fixed layout page, the visual content of the content document is displayed (block 306) on the fixed layout page and the device 100 does not allow (block 307) the visual content of the content document to re-flow to another page.

When displaying (block 305) the fixed layout page, the fixed layout page may be scaled by the scaling mechanism of the device 100 to fit the current size of the display 116 screen. Further, when displaying (block 306) the visual content of the content document on the fixed layout page, the visual content may be repositioned and resized by the scaling mechanism of the device 100 to fit the scaled fixed layout page size. An example scaling operation is described below with respect to FIG. 4.

On the other hand, if the content document is to be treated as a re-flowable document, then some or all of the visual content of the content document is displayed (block 308) on a page and the device 100 allows (block 309) the visual content of the content document to re-flow between pages.

While the steps of flowchart 300 are described and presented in a certain order, in other embodiments, the steps may be performed in an order that is different from the order shown and described and some steps may be performed in parallel.

Sample Scaling Operation

As mentioned above with reference to FIG. 3, when displaying (block 305) the fixed layout page corresponding to a content document, the fixed layout page may be scaled by the scaling mechanism of the device 100 to fit the current size of the display 116 screen. Further, the visual content of the content document may be repositioned and resized by the scaling mechanism to fit the scaled fixed layout page size. A sample scaling operation of device 100 with reference to FIG. 4 will now be described. In the example below, the scaling operation is described as being performed by device 100. The device 100 may comprise one or more logic elements for performing the scaling operation. The logical elements may be implemented entirely in software, entirely in hardware, or a combination of software and hardware. In one particular embodiment, the scaling operation is performed by the application 112 of device 100 in cooperation with the operating system 114 of device 100.

In the example scaling operation below, it is assumed that the layout viewport of the content document is larger in at least one dimension than the current size of the screen of display 116, and thus, that the fixed layout page must be scaled down to fit the current size of the screen. However, it will be apparent to one skilled in the art that a similar scaling operation could be performed to scale page up to fit the size of the screen. Further, in other embodiments, the device 100 may not scale the fixed layout page in response to a rendering event if, for example, the size of the layout viewport is such that the fixed layout page can fit entirely on the screen without scaling.

Turning now to the flowchart 400 of FIG. 4, the chart 400 depicts steps of the scaling down process according to an embodiment of the invention. The device 100 performs the steps for a content document of an electronic publication after determining the content document is to be treated as a fixed layout page. For example, the device 100 may perform the steps of chart 400 in the context of steps 305 and 306 of chart 300 of FIG. 3. The content document includes or references one or more visual content elements assigned to the fixed layout page by the publisher. A visual content element may be text or an image, for example.

At step 401, the device 100 obtains the aspect ratio and dimensions of the layout viewport for the content document. In some embodiments, the aspect ratio is obtained from the "<meta>" viewport element of the content document. In some embodiments, the dimensions (e.g., width and height in pixels) of the layout viewport are obtained from a stylesheet included or referenced by the content document. In particular, the dimensions of layout viewport may be obtained from the declared dimensions in the stylesheet for the HTML/XHTML "<body>" element. In some embodiments, both the aspect ratio and dimensions of the layout viewport are obtained from "<meta>" viewport element of the content document. In some embodiments, both are obtained from a stylesheet included or referenced by the content document. In some embodiments, the aspect ratio is obtained from a stylesheet included or referenced by the content document and the dimensions are obtained from the "<meta>" viewport element of the content document.

At step 402, the device 100 obtains data reflecting the current size of the screen of the display 116. The data indicates the current width of the screen in pixels and the current height of the screen in pixels. The current width and height of the screen may vary depending on the current orientation of the screen. In particular, if the screen is currently in landscape orientation when the data is obtained, then the current width of the screen will be larger than the current height. On the other hand, if the screen is currently in portrait orientation, then the current height will be larger than the current width. In some embodiments, the data reflecting the current size of the screen of display 116 is obtained from operating system 114. The operating system 114 provides the data as a return or output value from a function, sub-routine or Application Programming Interface (API) dedicated to providing information about the display 116 and the current state of the screen on display 116.

At step 403, the device 100 selects an initial size for a first dimension of the fixed layout page. The first dimension is either width or height. The initial size is selected such that the entire fixed layout page can be displayed on the screen of the display 116. Further, the initial size is selected so that the fixed layout page has an aspect ratio identical to or substantially identical to the aspect ratio of the layout viewport.

In some embodiments, width is selected as the first dimension if the layout viewport aspect ratio is larger than the screen aspect ratio. In other embodiments, height is selected as the first dimension if the layout viewport aspect ratio is smaller than the screen aspect ratio. For example, if the layout viewport are 1000 pixels wide by 1400 pixels high and the current size of the display screen is 768 pixels wide by 1024 pixels high, then height is selected as the first dimension.

Once the first dimension is selected, the device 100 selects (block 403) the initial size for the fixed layout page in the first dimension. In some embodiments, the device 100 selects an initial size equal to or substantially equal to the size of the screen in the first dimension. Returning the example in the previous paragraph, if height is selected as the first dimension, then, according to some embodiments, the device 100 would select an initial size for the height of the fixed layout page of 1024 pixels.

Once the initial size for the first dimension of the fixed layout page is selected, the initial size for the other dimension is calculated by the device 100 so that the fixed layout page maintains or substantially maintains the layout viewport aspect ratio. If the first dimension is height, then the initial size for the width of the fixed layout page can be calculated by multiplying the layout viewport aspect ratio by the current width of the screen. If the first dimension is width, then the initial size for the height of the fixed layout page can be calculated by dividing the current height of the screen by the layout viewport aspect ratio. Returning again to the previous example, since height was selected as the first dimension, the initial width of the fixed layout page would be approximately 731 or 732 pixels (1024 pixels* (1000 pixels/1400 pixels) depending on rounding.

In some embodiments, the fixed layout page does not completely fill the available screen real estate and some area around the border of the fixed layout page is used for other visual elements such as toolbars, fake book binding and pages, a small slice of the facing page, etc. At step 404, the device 100 adjusts the initial size of the fixed layout page to make room on the screen for the other border elements that consume screen real estate. The device 100 adjusts the initial fixed layout page size so that the layout viewport aspect ratio is maintained or substantially maintained. The result of the adjustment is a final fixed layout page size that is smaller than the initial fixed layout page size but that has the same or the substantially same aspect ratio as the initial fixed layout page size.

In some embodiments, the adjustment (block 404) involves the device 100 determining a size for the top, bottom, left and right borders. The border sizes may vary depending on what visual elements are displayed in the border areas surrounding the fixed layout page and the sizes of those elements. For example, the top border area may display a toolbar or other graphical user interface controls. If the fixed layout page is a right-facing page of the publication being displayed in a single-page spread, then the left border of the screen may, for example, contain a small vertical slice of the left-facing page, a fake binding, etc. and the right border may contain fake pages that appear stacked underneath the fixed layout page as would appear to the reader if reading an actual physical book or magazine. Similarly, if the fixed layout page is a left-facing page, the right border of the screen may, for example contain a slice of the right-facing page, a fake binding, etc. and the left border of the screen may contain fake pages. In either a single-page or two-page spread, one or more of the borders of the screen may have room for a fake cover. Once the sizes of the borders have been determined, the device 100 adjusts the initial fixed layout page size to produce the final fixed layout page size. The device 100 adjusts the initial fixed layout page size maintaining or substantially maintaining the aspect ratio of the layout viewport while at the same time making room for the border elements.

As an example, a content document with a layout viewport size of 1000 pixels wide and 1400 pixels high being rendered as a single page fixed layout page on a screen 768 pixels wide and 1024 pixels high may have an initial fixed layout page size of 731 pixels wide by 1024 pixels high. The initial fixed layout page size may be adjusted down to a final fixed layout page size of 686 pixels wide and 968 pixels high to make room on the screen for border elements. Note that the aspect ratios of the layout viewport, the initial fixed layout page, and the final fixed layout page are the same or substantially similar.

As another example, a content document with the same layout viewport size being rendered on a screen in landscape orientation as a single page fixed layout page as part of a two-page spread may have an initial fixed layout page size of 548 pixels wide by 768 pixels high (another content document is also rendered as another single page fixed layout page representing the facing page of the two-page spread). The initial fixed layout page size may be adjusted down to a final fixed layout page size of 500 pixels wide and 711 pixels high to make room on the screen for border elements. Again, the aspect ratios of the layout viewport, the initial fixed layout page, and the final fixed layout page are the same or substantially similar.

At step 405, a width-wise scaling factor and a height-wise scaling factor are determined by the device 100 based on the layout viewport dimensions and the final fixed layout page size. These scaling factors are used by the device 100 to reposition and resize visual elements assigned to the fixed layout page to fit the final fixed layout page size. The visual elements are repositioned and resized by the device 100 retaining the fixed layout specified the publisher. The width-wise scaling factor and the height-wise scaling factor represent the percentage positions and sizes of visual elements should be adjusted width-wise and height-wise to fit the final fixed layout page size. The width-wise scaling factor may be determined by dividing the width of the final fixed layout page by the specified width of the layout viewport. The height-wise scaling factor may determined by dividing the height of the final fixed layout page by the height of the layout viewport. As an example, if the layout viewport size is 1000 pixels wide by 1400 pixels high and the final fixed layout page size is 500 pixels wide and 711 pixels high, then the width-wise scaling factor is 50% and the height-wise scaling factor is approximately 51%.

At step 406, the position and size of visual content elements assigned to the fixed layout page by the publisher are scaled down by the device 100 to fit the final fixed layout page size based on the width-wise scaling factor and the height-wise scaling factor. This scaling down may occur as the device 100 is rendering the visual content elements on the final fixed layout page. For example, the device 100 may read and parse the content document as a stream of bytes, as the device 100 encounters a sequence of bytes representing a visual content element to be rendered on the fixed layout page, the device 100 may perform the scaling down.

In some embodiments, for a visual content element that is precisely positioned on the layout viewport by the publisher, that position is scaled down by the device 100 to fit the final fixed layout page size. For example, if a text block or image is positioned by the publisher to begin at 100 pixels from the left border and 400 pixels down from the top border of a layout viewport 1000 pixels wide and 1400 pixels high, then the position to begin rendering the text block on a final fixed layout page 500 pixels wide and 711 pixels high is 50 pixels (500/100*100) from the left border of the final fixed layout page and 203 pixels (711/1400*400) from the top border of the final fixed layout page.

In some embodiments, the size (width and height) of an image is also scaled down based on the width-wise scaling factor and a height-wise scaling factor. For example, an image 1000 pixels wide and 1400 pixels high positioned on a layout viewport 2000 pixels wide and 2800 pixels high would, when presented on a final fixed layout page size of 500 pixels wide and 711 pixels high, be scaled down to 250 pixels wide (500/2000*1000) and 355 pixels high (711/2800*1400). Note that the image as scaled down to fit the final fixed layout page size consumes roughly the same percentage area of the final fixed layout page as the original image size consumed of the layout viewport.

In some embodiments, font glyphs for text to be displayed on the fixed layout page are not rasterized until the font glyphs are ready to be drawn on the fixed layout page. The pixels to be drawn are determined using the vector paths for the glyph font. Rasterized glyphs are scaled based on the width-wise and/or height-wise scaling factors.

While the steps of flowchart 400 are described and presented in a certain order, in other embodiments, the steps may be performed in an order that is different from the order shown and described and some steps may be performed in parallel.

Visual Effects with Page Images

In some embodiments, the device 100 generates digital images of rendered fixed layout pages of a fixed layout publication. The digital images are used to provide three different visual effects. In one effect, the table of contents of a fixed layout publication provides, in addition to any textual information, a thumbnail image of each fixed layout page referenced in the table of contents. In a second effect, when a reader provides input to turn a fixed layout page of the publication, the rendered fixed layout page is replaced with a generated digital image of the fixed layout page and an animated visual curling effect is applied to the image so that the fixed layout page appears to turn as if a real physical paper page. In a third effect, thumbnail images of fixed layout pages are provided as the reader provides input to a "scrubber" graphical user interface component of the device 100.

Generating the Digital Images

In some embodiments, the device 100 generates a digital image for a fixed layout page by rendering the fixed layout page to a virtual screen buffer and capturing an image of the fixed layout page from the screen buffer as an image file such as, for example, a JPEG or PNP image file. The image file may be stored on a storage 106 of the device 100. In some embodiments, to generate a digital image for a fixed layout page, the device 100 instantiates a virtual screen buffer having a virtual screen size corresponding to the size of the layout viewport. The device 100 renders the fixed layout page to the screen buffer to fill the virtual screen and captures the image from the screen buffer. For example, a layout viewport 1000 pixels wide by 1400 pixels high would generate an image 1000 pixels by 1400 pixels.

Scaled down versions of the image captured from the virtual screen buffer may also be generated and stored as image files. For example, the device 100 may generate a thumbnail version of a captured screen buffer image for the table of contents visual effect and/or the scrubber visual effect. The device 100 may generate two scaled down versions of a captured screen buffer image for the page turning effect: one for the corresponding fixed layout page when displayed in a single-page spread and the other for the corresponding fixed layout page when displayed in a two-page spread.

The device 100 may generate the screen buffer image and the thumbnail and scaled down images at times that minimize the impact on rendering the publication on the display 116. For example, screen buffer images and thumbnail images may be generated for only the fixed layout pages referenced in the table of contents. Thereafter, screen buffer images, thumbnail images, and scaled down images may be generated for the other pages just-in-time as the reader views a fixed layout page or previews a fixed layout page with the scrubber. Further, once generated, the generated image files may be cached on a storage 106 to avoid repeatedly generating the same image file.

Techniques known in the art may be used to capture an image from a virtual screen buffer and to scale the captured screen buffer image down to thumbnail size or other size.

In the foregoing description, embodiments of the present invention have been described with reference to numerous specific details that may vary from implementation to implementation. Thus, the sole and exclusive indicator of what is the invention, and is intended by the Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   at a computing device with a display of one or more input devices:
   parsing a first file of an electronic publication for a value of a first markup language element contained in the first file, the value of the first markup language element specifying whether the electronic publication is to be treated as a fixed-layout publication or as a re-flowable publication, wherein the electronic publication includes text;
   determining whether to treat the electronic publication as a fixed-layout publication or as a re-flowable publication based on the value of the first markup language element;
   receiving, via the one or more input devices, a request to display a portion of the electronic publication in a display area that has an available size for displaying the portion of the electronic publication, wherein the electronic publication is associated with a layout viewport that includes a width of the electronic publication; and
   in response to receiving the request to display the portion of the electronic publication in the display area:
      in accordance with a determination that the electronic publication is to be treated as a fixed-layout publication, the electronic publication fixed layout having an associated aspect ratio:
         displaying, on the display, the portion of the publication scaled in accordance with the available size of the display area while maintaining the fixed layout of the publication and the associated aspect ratio without reflowing the text,
      in accordance with a determination that the electronic publication is to be treated as a re-flowable publication, displaying, on the display, the portion of the publication with the text reflowed to fit into the display area such that the reflowed text is independent of the relation between the width of the layout viewport and a width of the display.

2. The computer-implemented method of claim 1, wherein the file is not a content document of the electronic publication.

3. The computer-implemented method of claim 1, wherein the first markup language element is a markup language meta element.

4. The computer-implemented method of claim 1, wherein the value of the first markup language meta element is a value of a property of the first markup language meta element.

5. The computer-implemented method of claim 1, further comprising:
   parsing the first file for a value of a second markup language element contained in the first file, the value of the second markup language element specifying whether the electronic publication is constrained to a display screen orientation selected from the group consisting of landscape and portrait; and
   based on the value of the second markup language element, locking display of the electronic publication to the display screen orientation specified by the value of the second markup language element.

6. The computer-implemented method of claim 1, further comprising:
   parsing a second file of the electronic publication to determine dimensions of the layout viewport; and
   based on the determined dimensions of the layout viewport, scaling visual content of the electronic publication to fit dimensions of a display screen.

7. The computer-implemented method of claim 6, wherein the second file is a content document of the electronic publication that is not the first file.

8. The computer-implemented method of claim 6, wherein the dimensions of the layout viewport are expressed in the second file in terms of pixel-width and pixel-height.

9. The computer-implemented method of claim 1, including:
   prior to displaying the electronic publication:
      parsing the first file of an electronic publication for a value of a second markup language element contained in the first file, the value of the second markup language element specifying whether to initially display the electronic publication in a single page format or a two page spread format; and determining whether to initially display the electronic publication in a single page format or a two page spread format based on the value of the second markup language element.

10. The computer-implemented method of claim 1, including:
in response to determining that the electronic publication is to be treated as a fixed layout publication, disabling the user's option to change the font and font-size of text included in the electronic publication.

11. The computer-implemented method of claim 1 wherein the fixed-layout publication has at least one fixed layout page that comprises at least one of a single page or two-page spread including visual content that does not reflow between pages.

12. The computer-implemented method of claim 11 wherein the two-page spread further comprises two consecutive facing pages of an electronic publication displayed side-by-side.

13. One or more non-transitory computer-readable media storing instructions which, when executed by a computing device, cause the computing device to perform a method comprising:
at a computing device with a display of one or more input devices:
parsing a first file of an electronic publication for a value of a first markup language element contained in the first file, the value of the first markup language element specifying whether the electronic publication is to be treated as a fixed-layout publication or as a re-flowable publication, wherein the electronic publication includes text;
determining whether to treat the electronic publication as a fixed-layout publication or as a re-flowable publication based on the value of the first markup language element;
receiving, via the one or more input devices, a request to display a portion of the electronic publication in a display area that has an available size for displaying the portion of the electronic publication, wherein the electronic publication is associated with a layout viewport that includes a width of the electronic publication; and
in response to receiving the request to display the portion of the electronic publication in the display area:
in accordance with a determination that the electronic publication is to be treated as a fixed-layout publication, the electronic publication fixed layout having an associated aspect ratio:
displaying, on the display, the portion of the publication scaled in accordance with the available size of the display area while maintaining the fixed layout of the publication and the associated aspect ratio without reflowing the text,
in accordance with a determination that the electronic publication is to be treated as a re-flowable publication, displaying, on the display, the portion of the publication with the text reflowed to fit into the display area such that the reflowed text is independent of the relation between the width of the layout viewport and a width of the display.

14. The one or more non-transitory computer-readable media of claim 13, wherein the file is not a content document of the electronic publication.

15. The one or more non-transitory computer-readable media of claim 13, wherein the first markup language element is a markup language meta element.

16. The one or more non-transitory computer-readable media of claim 13, wherein the value of the first markup language meta element is a value of a property of the first markup language meta element.

17. The one or more non-transitory computer-readable media of claim 13, the method further comprising:
parsing the first file for a value of a second markup language element contained in the first file, the value of the second markup language element specifying whether the electronic publication is constrained to a display screen orientation selected from the group consisting of landscape and portrait; and
based on the value of the second markup language element, locking display of the electronic publication to the display screen orientation specified by the value of the second markup language element.

18. The one or more non-transitory computer-readable media of claim 13, the method further comprising:
parsing a second file of the electronic publication to determine dimensions of the layout viewport; and
based on the determined dimensions of the layout viewport, scaling visual content of the electronic publication to fit dimensions of a display screen.

19. The one or more non-transitory computer-readable media of claim 18, wherein the second file is a content document of the electronic publication that is not the first file.

20. The one or more non-transitory computer-readable media of claim 18, wherein the dimensions of the layout viewport are expressed in the second file in terms of pixel-width and pixel-height.

21. The one or more non-transitory computer-readable media of claim 13, the method including:
prior to displaying the electronic publication:
parsing the first file of an electronic publication for a value of a second markup language element contained in the first file, the value of the second markup language element specifying whether to initially display the electronic publication in a single page format or a two page spread format; and
determining whether to initially display the electronic publication in a single page format or a two page spread format based on the value of the second markup language element.

22. The one or more non-transitory computer-readable media of claim 13, the method including:
in response to determining that the electronic publication is to be treated as a fixed layout publication, disabling the user's option to change the font and font-size of text included in the electronic publication.

23. The one or more non-transitory computer-readable media of claim 13 wherein the fixed-layout publication has at least one fixed layout page that comprises at least one of a single page or two-page spread including visual content that does not reflow between pages.

24. The one or more non-transitory computer-readable media of claim 23 wherein the two-page spread further comprises two consecutive facing pages of an electronic publication displayed side-by-side.

25. A computing device comprising:
one or more processors; and
one or more non-transitory computer-readable media storing instructions which, when executed by the one or more processors, cause performance of a method comprising:
at a computing device with a display of one or more input devices:

parsing a first file of an electronic publication for a value of a first markup language element contained in the first file, the value of the first markup language element specifying whether the electronic publication is to be treated as a fixed-layout publication or as a re-flowable publication, wherein the electronic publication includes text;

determining whether to treat the electronic publication as a fixed-layout publication or as a re-flowable publication based on the value of the first markup language element;

receiving, via the one or more input devices, a request to display a portion of the electronic publication in a display area that has an available size for displaying the portion of the electronic publication, wherein the electronic publication is associated with a layout viewport that includes a width of the electronic publication; and in response to receiving the request to display the portion of the electronic publication in the display area:

in accordance with a determination that the electronic publication is to be treated as a fixed-layout publication, the electronic publication fixed layout having an associated aspect ratio:

displaying, on the display, the portion of the publication scaled in accordance with the available size of the display area while maintaining the fixed layout of the publication and the associated aspect ratio without reflowing the text, in accordance with a determination that the electronic publication is to be treated as a re-flowable publication, displaying, on the display, the portion of the publication with the text reflowed to fit into the display area such that the reflowed text is independent of the relation between the width of the layout viewport and a width of the display.

26. The computing device of claim 25, wherein the file is not a content document of the electronic publication.

27. The computing device of claim 25, wherein the first markup language element is a markup language meta element.

28. The computing device of claim 25, wherein the value of the first markup language meta element is a value of a property of the first markup language meta element.

29. The computing device of claim 25, the method further comprising:

parsing the first file for a value of a second markup language element contained in the first file, the value of the second markup language element specifying whether the electronic publication is constrained to a display screen orientation selected from the group consisting of landscape and portrait; and based on the value of the second markup language element, locking display of the electronic publication to the display screen orientation specified by the value of the second markup language element.

30. The computing device of claim 25, the method further comprising:

parsing a second file of the electronic publication to determine dimensions of the layout viewport; and based on the determined dimensions of the layout viewport, scaling visual content of the electronic publication to fit dimensions of a display screen.

31. The computing device of claim 30, wherein the second file is a content document of the electronic publication that is not the first file.

32. The computing device of claim 30, wherein the dimensions of the layout viewport are expressed in the second file in terms of pixel-width and pixel-height.

33. The computing device of claim 25, the method including:

prior to displaying the electronic publication:

parsing the first file of an electronic publication for a value of a second markup language element contained in the first file, the value of the second markup language element specifying whether to initially display the electronic publication in a single page format or a two page spread format; and determining whether to initially display the electronic publication in a single page format or a two page spread format based on the value of the second markup language element.

34. The computing device of claim 25, the method including:

in response to determining that the electronic publication is to be treated as a fixed layout publication, disabling the user's option to change the font and font-size of text included in the electronic publication.

35. The computing device of claim 25 wherein the fixed-layout publication has at least one fixed layout page that comprises at least one of a single page or two-page spread including visual content that does not reflow between pages.

36. The computing device of claim 35 wherein the two-page spread further comprises two consecutive facing pages of an electronic publication displayed side-by-side.

* * * * *

UNITED STATES PATENT AND TRADEMARK OFFICE
CERTIFICATE OF CORRECTION

PATENT NO. : 9,460,530 B2  
APPLICATION NO. : 13/466959  
DATED : October 4, 2016  
INVENTOR(S) : Casey M. Dougherty et al.

Page 1 of 1

It is certified that error appears in the above-identified patent and that said Letters Patent is hereby corrected as shown below:

On the title page:

(73) Assignee: replace "APLLE INC." with --APPLE INC.--

Signed and Sealed this  
Sixth Day of December, 2016

Michelle K. Lee  
*Director of the United States Patent and Trademark Office*